US006720681B2

(12) United States Patent
Hsiao

(10) Patent No.: US 6,720,681 B2
(45) Date of Patent: Apr. 13, 2004

(54) STRUCTURE AND MANUFACTURING METHOD OF A LINEAR STEPPING MOTOR

(75) Inventor: Shuen-Shing Hsiao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 110 days.

(21) Appl. No.: 09/994,690

(22) Filed: Nov. 28, 2001

(65) Prior Publication Data
US 2002/0180280 A1 Dec. 5, 2002

(30) Foreign Application Priority Data
Jun. 5, 2001 (TW) ........................... 90113760 A

(51) Int. Cl.[7] ............................................. H02K 41/00
(52) U.S. Cl. .......................................... 310/12; 310/216
(58) Field of Search ............................... 310/12–14, 216

(56) References Cited

U.S. PATENT DOCUMENTS

| | | | | | |
|---|---|---|---|---|---|
| 2,423,869 A | * | 7/1947 | Blessing | .................... | 428/461 |
| 4,136,296 A | * | 1/1979 | Hickey | ........................ | 310/269 |
| 4,454,438 A | * | 6/1984 | Yamashita et al. | .......... | 310/162 |
| 4,707,313 A | * | 11/1987 | Houle | ......................... | 148/522 |
| 4,712,027 A | * | 12/1987 | Karidis | ........................ | 310/12 |
| 4,835,424 A | * | 5/1989 | Hoffman et al. | ............... | 310/12 |
| 5,296,773 A | * | 3/1994 | El-Antably et al. | ......... | 310/261 |
| 2002/0105237 A1 | * | 8/2002 | Itoh et al. | ..................... | 310/12 |

OTHER PUBLICATIONS

Laithwaite et al., Linear–Motion Electrical Machines, proceedings of the IEEE, vol. 58, No. 4, Apr. 1970, pp. 531–542.*

* cited by examiner

Primary Examiner—Nicholas Ponomarenko
Assistant Examiner—David W. Scheuermann
(74) Attorney, Agent, or Firm—Bacon & Thomas, PLLC

(57) ABSTRACT

The present invention relates to a new-type secondary structure of a linear stepping motor and its manufacturing method. The new-type secondary structure of a linear stepping motor is mainly composed of several permeance sheets and insulating sheets which are arranged in stagger one by one. The manufacturing method is to shape the permeance sheets and insulating sheets in advance, and then combine and glue these sheets. Several advantages of the present invention are easy to be manufactured, having less weight, producing low eddy current, incurring lower cost and having better quality control.

10 Claims, 3 Drawing Sheets

STRUCTURE AND MANUFACTURING METHOD OF A LINEAR STEPPING MOTOR

BACKGROUND OF THE INVENTION

1. Field of the Invention

The present invention relates to a linear stepping motor, especially for a new-type secondary structure of a linear stepping motor and its manufacturing method.

2. Description of the Prior Art

Linear stepping motors are applied in industry widely. For example, some equipment such as a wafer clamper and a high-speed wafer scanner, is equipped with linear stepping motors and act due to excitation between the primary and secondary of linear stepping motors. Commonly used secondary structure of the linear stepping motor is usually manufactured by milling or etching teeth. Teeth milling and etching have the following disadvantages, respectively:

1. Disadvantages of milling teeth
   (1) It is uneasy to manufacture: For the sake of shortening the displacement of each step to improve the resolution of the stepping motors, tooth grooves are usually thin and deep so that the special-purpose cutting tool is not easy to be manufactured and is expensive in cost while short in life. Besides, processing rate is slow, and process cost is high;
   (2) It is uneasy to measure: After milling teeth, products are not easy to be measured, so expensive apparatus are essential to examine and the quality is not easy to be controlled;
   (3) The weight is heavy: The whole solid block of metal is used to be processed, so the product is heavy in weight;
   (4) Eddy current: For the sake of using a whole metal block, which is a good conductor, eddy current is produced, while the motor is excited, such that energy is wasted;
   (5) Restriction of length and area: The length and area of the secondary structure of the motor are restricted by the working area of the milling-machining frame.

2. Disadvantages of etching teeth:
   (1) Process is complicate: Several steps such as washing, photograph development and exposure, and etching, etc, are complicate. Besides, if deeper etching depth is required, longer etching time and higher manufacturing cost are caused;
   (2) High pollution: Chemical reactant used for etching accompanies with high pollution, therefore it easily results in environmental problems;
   (3) The same situation of heavy weight, restricted area and producing eddy current as in the aforementioned teeth milling occurs for the same reason, using a whole metal block.

SUMMARY OF THE INVENTION

The purpose of the present invention is to provide a new-type secondary structure of a linear stepping motor and its manufacturing method. By the design of the present invention, the manufacture of the secondary structure of a linear stepping motor is simpler and cheaper. Besides, both weight and eddy current of the secondary of the linear stepping motor are reduced. Quality control is easier and more efficient. The structure of the new-type secondary structure of the linear stepping motor mainly comprises several permeance sheets and insulating sheets arranged in stagger one by one. The permeance sheets are made of permeance material, which usually is (pure) iron or silicon steel, and so on. The insulating sheets are made of material with poor permeance. Among many common materials with poor permeance, ones still having characteristics of light mass, good combination, sufficient strength and good machinability are resin, glass and glass fiber compound material, carbon fiber compound material. Especially glass fiber compound material, because it's relatively cheaper in price and better in strength, it is a very ideal material for insulating sheets.

After the permeance sheets and insulating sheets are shaped, and before they are assembled, the secondary structure can be easily measured so that the thickness of the aforementioned sheets can be got and the precision of the tooth shape can be controlled. When the structure is manufactured, the process just comprises arranging the permeance sheets and insulating sheets in stagger one by one and then combining these sheets. Therefore, the manufacture process is very simple. There are many methods of combining the permeance sheets and insulating sheets, for example, pressurizing and shaping, arranging regularly and locking via screws or gluing, etc. For the surface of combined permeance sheets and insulating sheets, colloid is filled into the clearance of the permeance teeth and then the top surface of combined permeance sheets and insulating sheets are ground to get a flat plane to make the slide between the primary and the secondary structure more smooth.

Because the secondary structure of the linear stepping motor can be piled successively, the restriction of length or area of milling or etching teeth of traditional manufacturing methods can be overcome. Besides, the use of the insulating sheets with specific gravity less than metal, the total weight of secondary structure can be lowered to reduce the inertial while the secondary structure serves as a rotor, the lighter weight or smaller inertial yields larger acceleration. In addition, because of the isolation effect of the insulating sheets, less eddy current is produced so that efficiency of the motor is increased and temperature rise is decreased.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
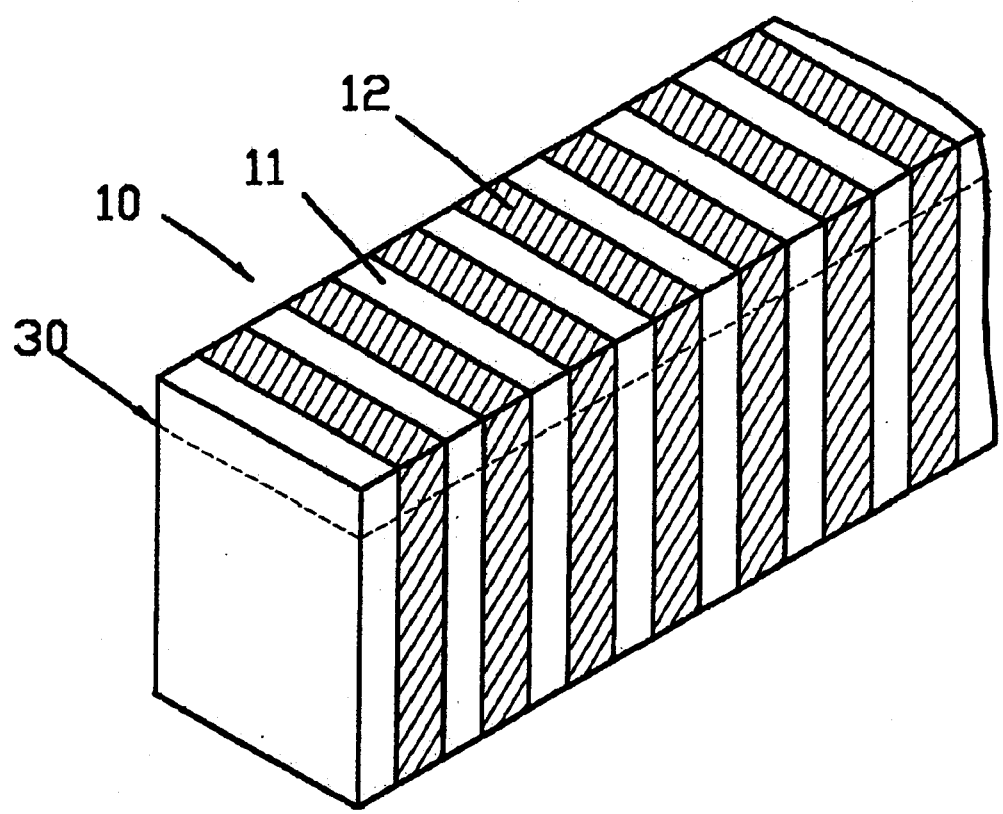
FIG. 1 is the diagram of the appearance of the present invention, the secondary structure of a linear stepping motor.

Please refer to FIG. 1, which is the diagram of the appearance of the present invention, the secondary structure of a linear stepping motor, the secondary structure 10 mainly comprises permeance sheets 11 (which can be a silicon steel plate or thin iron plate structure) and insulating sheets 12 (which can be a glass fiber structure), and both permeance sheets 11 and insulating sheets 12 are thin sheets and arranged in stagger. The manufacturing method of the secondary structure 10 is to first make the permeance sheets 11, which are made of good permeance material such as silicon steel or iron and shaped as a sheet in advance, and the insulating sheets 12, which are made of poor permeance material such as glass fiber and shaped as a sheet in advance, arranged in stagger, and secondly, to shape the ordered sheets by using the jig to pressurize and then to glue, and next, the surface is ground to be a flat plane such that the slide between the new-type secondary structure and the primary of the linear stepping motor provided from the present invention is smooth.

Figure 2:
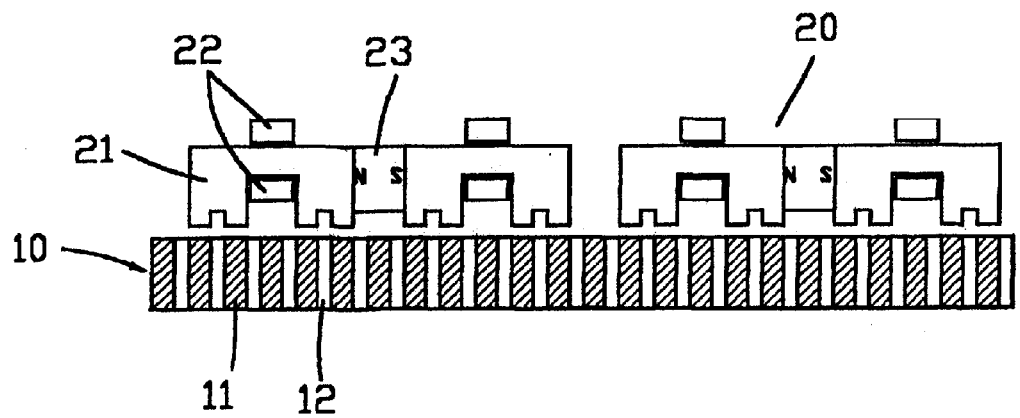
FIG. 2 is the schematic diagram of the case of applying FIG. 1 in the one-axis linear stepping motor.

FIG. 2 is the schematic diagram of the case of applying FIG. 1 in the one-axis linear stepping motor. The secondary structure of the linear stepping motor 10 is arranged in pair with the primary structure 20. The secondary structure of the linear stepping motor 10 comprises permeance sheets 11 and insulating sheets 12. The primary structure 20 is composed of an iron core 21, coils 22 and a permanent magnet 23. In addition to the magnetic flux caused by permanent magnet 23, the varying current flowing through coil 22 mounted on the iron coil 21 generates corresponding amount of magnet flux in the primary structure 20. In the mean while, reluctance is different according to the relative position of the primary structure 20 and the secondary one 10. The combined effect of these two mechanism forms the electromagnetic force to move the linear stepping motor.

Figure 3:
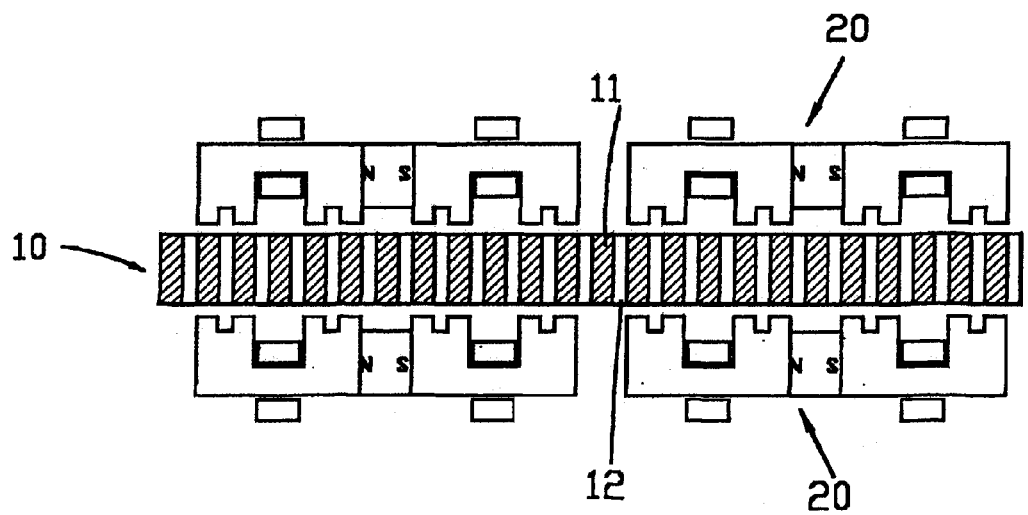
FIG. 3 is the schematic diagram of the case of applying FIG. 1 in the thin-plate-type linear stepping motor.

FIG. 3 is the schematic diagram of the application of the thin-plate-type linear stepping motor. The linear stepping motor is similarly composed of a secondary structure 10 arranged in pair with the primary structure 20. The secondary structure of the linear stepping motor 10 comprises permeance sheets 11 and insulating sheets 12. The primary structure 20 is usually a mover while the secondary structure 10 is a stator. While the secondary structure is used as a mover, the acceleration of the linear stepping motor of the present invention is larger than that of the traditional secondary structure, because the insulating sheets 12 of the new-type secondary structure has a smaller specific gravity, i.e., the inertia of the new-type secondary structure is smaller.

Figure 4:
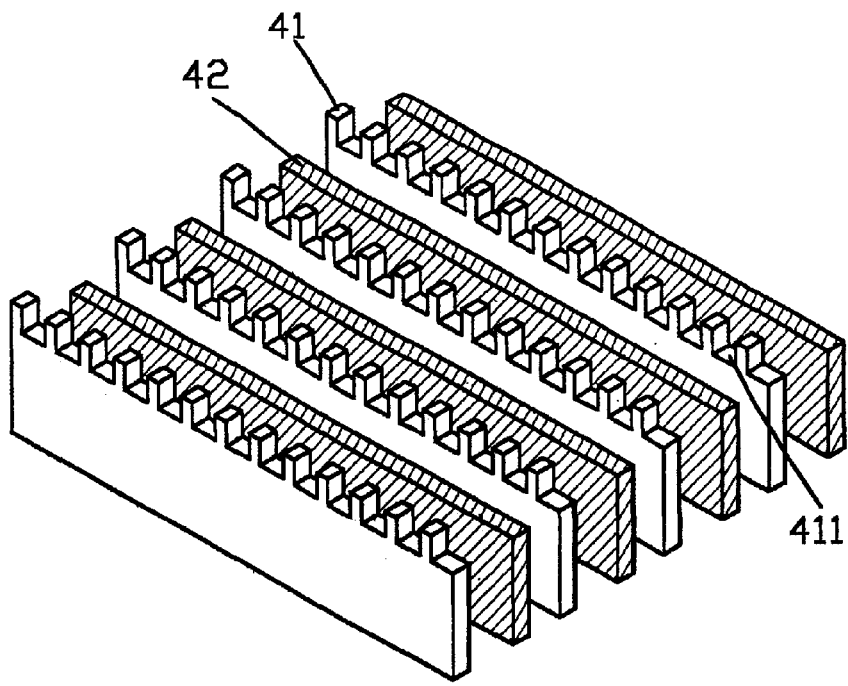
FIG. 4 is the schematic diagram showing the planar linear stepping motor applying the present invention before the present invention is assembled.

Furthermore, the present invention is mode in view of practicability, and devised from the electromagnetism and mechanics, so except for the one-axis linear motor shown in FIG. 2 and FIG. 3, the present invention can be applied to dual-direction planar linear motor in practice. The manufacturing method of the secondary structure of the planar linear motor consists of two methods as follows:

1. Please refer to FIG. 4 and FIG. 5, first, the permeance sheets 41 and insulating sheets 42 are manufactured and shaped first, especially that permeance teeth 411 are set on the permeance sheets 41, and shaped by finishing or punching such that the manufacturing method is relatively simple. Besides, because the permeance sheets are in the sheet shape, the thickness is easy to be measured and controlled. Because of the permeance sheets 41 are in the sheet shape, the permeance teeth 411 can be measured by projection method so that the shape is easier to be controlled, while the teeth shape is hard to measure in traditional methods. After the permeance sheets 41 and the insulating sheets 42 are combined together, the colloid 43, such as epoxy resin, is filled into the clearance of the permeance teeth 411, then the top surface is ground to a flat plane, as in the secondary structure of the planar linear motor. The method is very convenient in manufacturing, and has the effect of reducing the inertia of the secondary structure of the linear stepping motor.

Figure 5:
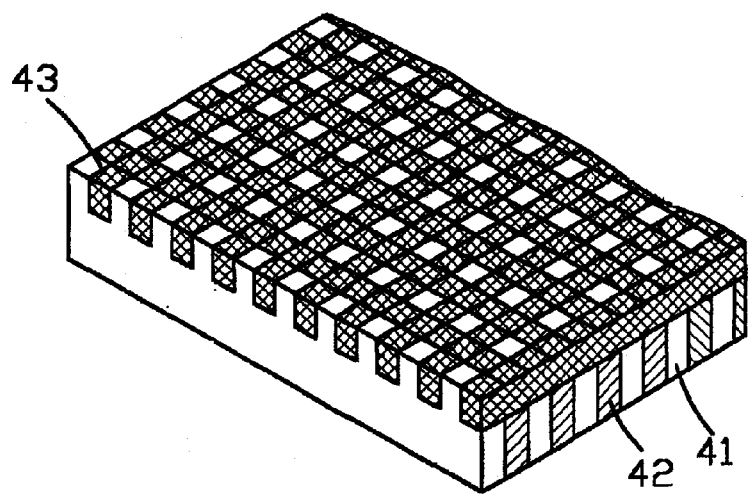
FIG. 5 is the diagram of the appearance of that FIG. 4 is finished assembling and gluing.

2. Please refer to the secondary structure of the linear stepping motor in FIG. 1 again, the shape of the permeance teeth 411 in FIG. 5 is cut or finished to the dash line 30 of the secondary structure of the linear stepping motor in FIG. 1. The method similarly has the effect of reducing the inertia of the secondary structure of the linear stepping motor because the insulating sheets are made of material having specific gravity smaller than metal.

The secondary structure of the linear stepping motor of the present invention is made by arranging the permeance sheets and insulating sheets in stagger and then pressurizing to shape. In this patent several secondary structures can be combined. Similarly, so there will be no restriction in length, width or volume, and the disadvantage of shaping a whole metal block and being unable to lengthen the secondary. Also, because the secondary structure is not manufactured from a whole metal block, eddy current can be effectively reduced. In addition, the manufacturing process is easy. In particular, arranging insulating sheets with lighter weight among permeance sheets in stagger decreases the weight of secondary structure. Summing up every advantage of the present invention, no traditional technology can be compared with.

Many changes and modifications in the aforementioned embodiment of the invention can, of course, be carried out without departing from the scope thereof. Accordingly, to promote the progress in science and the useful arts, the invention is disclosed and intended to be limited only by the scope of the appended claims.

What is claimed is:

1. A secondary structure of a linear stepping motor, which comprises a plurality of permeance sheets and a plurality of insulating sheets; said permeance sheets and said insulating sheets having a thin plate shape, said permeance sheets being made of a first material having good permeance and said insulating sheets being made of a second material having poor permeance, wherein said permeance sheets and said insulating sheets are arranged in stagger and combined together, and wherein said second material having poor permeance is glass fiber.

2. A secondary structure of a linear stepping motor as recited in claim 1, wherein said first material having good permeance is silicon steel.

3. A secondary structure of a linear stepping motor as recited in claim 1, wherein said first material having good permeance is pure iron.

4. A secondary structure of a linear stepping motor as recited in claim 1, wherein said permeance sheets have a plurality of permeance teeth used in a planar linear stepping motor.

5. A secondary structure of a linear stepping motor as recited in claim 1, wherein a clearance between said permeance teeth is filled with colloid.

6. A secondary structure of a linear stepping motor as recited in claim 1, wherein a method used for connecting and combining said permeance sheets and said insulating sheets arranged in stagger is pressurization.

7. A secondary structure of a linear stepping motor as recited in claim 1, wherein a method used for combining said permeance sheets and said insulating sheets arranged in stagger is gluing with colloid.

8. A secondary structure of a linear stepping motor as recited in claim 1, wherein a method used for combining said permeance sheets and said insulting sheets arranged in stagger is using a plurality of screws.

9. A manufacturing method of a secondary structure of a linear stepping motor, comprising steps of:
   a. using a first plate of a permeance material to make permeance sheets with a first contour designed in advance, and using a second plate of glass fiber to make insulating sheets with a second contour designed in advance;
   b. arranging said permeance sheets and said insulating sheets in stagger one by one, and
   c. combining said permeance sheets and said insulating sheets;

whereby said secondary structure of said linear stepping motor is manufactured.

10. A manufacturing method of said secondary structure of a linear stepping motor as recited in claim 9, wherein a manufacturing method of said contour designed in advance is punching.

* * * * *